United States Patent
Kobayashi et al.

[11] Patent Number: 5,334,473
[45] Date of Patent: * Aug. 2, 1994

[54] CONTINUOUS METHOD OF TREATING POLYMER REACTION MIXTURE

[75] Inventors: Nobuki Kobayashi, Mobara; Yoku Shiraishi, Chiba; Takashi Yamamoto, Mobara; Masaaki Shin, Fujisawa, all of Japan

[73] Assignee: Mitsui Toatsu Chemicals, Incorporated, Tokyo, Japan

[*] Notice: The portion of the term of this patent subsequent to Jan. 28, 2009 has been disclaimed.

[21] Appl. No.: 29,360

[22] Filed: Mar. 10, 1993

Related U.S. Application Data

[63] Continuation of Ser. No. 922,008, Aug. 4, 1992, abandoned, which is a continuation of Ser. No. 360,888, Jan. 23, 1991, abandoned.

[51] Int. Cl.⁵ .................................................. G03G 9/00
[52] U.S. Cl. .................................................. 430/109; 430/904
[58] Field of Search .................................................. 430/109, 904

[56] References Cited

U.S. PATENT DOCUMENTS

| | | | |
|---|---|---|---|
| 4,246,332 | 1/1981 | Tanaka et al. | 430/109 |
| 4,386,147 | 5/1983 | Seimiya et al. | 430/99 |
| 4,572,885 | 2/1986 | Sato et al. | 403/99 |
| 4,727,010 | 2/1988 | Shin et al. | 430/120 |
| 5,084,368 | 1/1992 | Hirayama et al. | 430/109 |

FOREIGN PATENT DOCUMENTS

| | | | |
|---|---|---|---|
| 48-29797 | 9/1973 | Japan | |
| 56-24411 | 3/1981 | Japan | |
| 179508 | 8/1987 | Japan | 528/501 |

OTHER PUBLICATIONS

Noribumi Itou et al., "Method for continuously removing the volatile content of a reactive copolymer". English translation of Japan 56-24411, (Publication date: Mar. 9, 1981). pp. 3–4.
Patent Abstracts of Japan, vol. 12, No. 28 (C-471) [2875], Jan. 27, 1988; & JP-A 62 179 508 (Mitsui Toatsu Chem. Inc.) Jun. 8, 1987 *Whole Abstract.

*Primary Examiner*—Joseph L. Schofer
*Assistant Examiner*—David Wu
*Attorney, Agent, or Firm*—Oblon, Spivak, McClelland, Maier & Neustadt

[57] ABSTRACT

A continuous method of treating a polymer reaction mixture for continuously separating a styrene polymer and volatile ingredient by flowing down, for example, a mixture of low molecular weight styrene polisher and high molecular weight styrene polymer through a circular-ring-shaped space formed between a jacketed double pipe and a concentrically located inner pipe of a heat-exchanger, and flashing into a vacuum chamber connected with said heat-exchanger, is provided.

The polymer is useful for the preparation of electrophotographic toner.

2 Claims, 1 Drawing Sheet

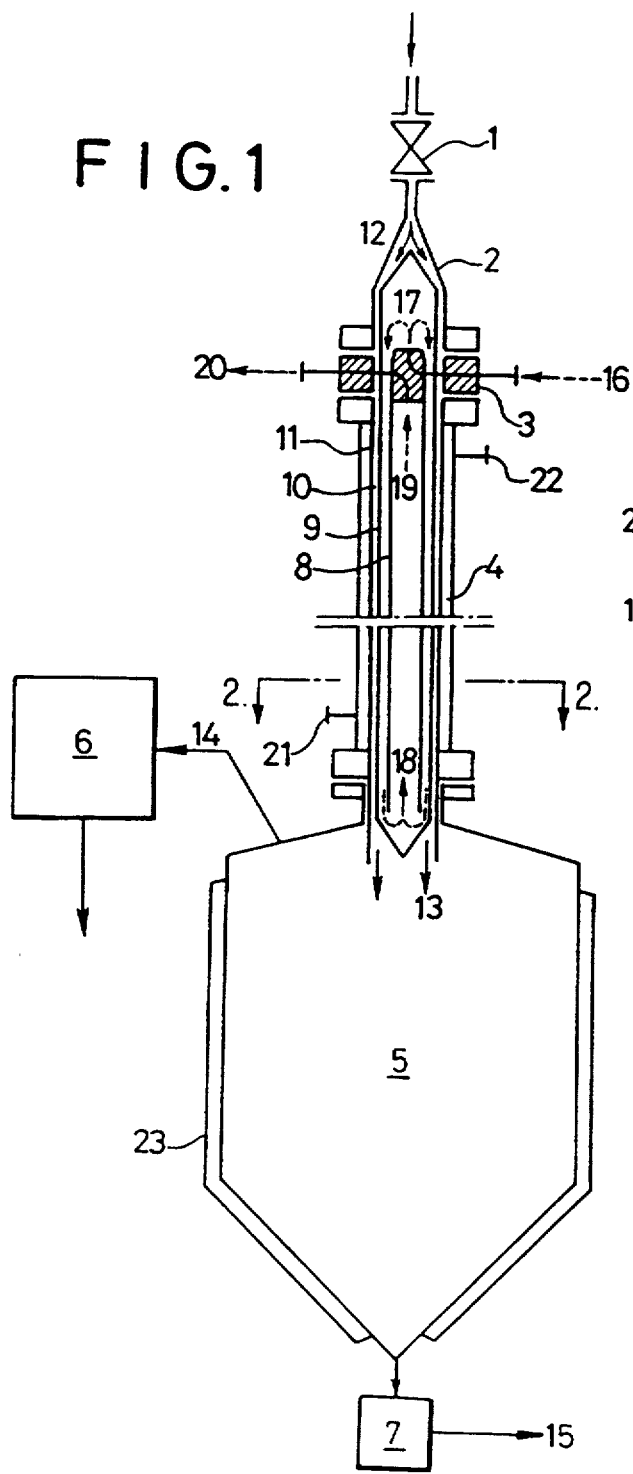
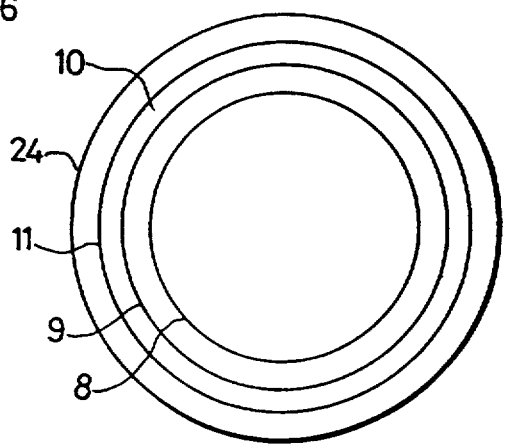

5,334,473

CONTINUOUS METHOD OF TREATING POLYMER REACTION MIXTURE

This application is a continuation-in-part of parent application Ser. No. 07/320,239, filed Sept. 30, 1987, now U.S. Pat. No. 5,084,368, which is a continuation of application Ser. No. 07/922,008, filed on Aug. 4, 1992, now abandoned, which is a FNC of Ser. No. 07/360,888, filed on Jan. 23, 1991, now abandoned.

BACKGROUND OF THE INVENTION

1. Field of the Invention

The present invention relates to a method for separating a styrene polymer useful in the field of electrophotographic toner by continuously treating a reaction mixture containing the styrene polymer prepared by the homopolymerization of styrene monomer or its copolymerization with other vinyl monomer to separate and remove volatile ingredients such as unreacted monomer, polymerization solvent and decomposition product of polymerization initiator by use of a specific separation equipment of the volatile ingredients.

2. Description of the Prior Art

Methods for separating the bulk- or solution-polymerized styrene polymer from the reaction mixture have been disclosed in Japanese Patent Publication Nos. 31678/1970, 29797/1973 etc. The styrene polymer described in these publications has a relatively high molecular weight in order to use, for example, for molding application. These methods have a disadvantage and not suitable for treating the reaction mixture containing the styrene polymer of this invention.

For example, Japanese Patent Publication No. 29797/1973 discloses a method for using a vertical multitubular heat-exchanger. In the case, however, of applying the heat-exchanger for the reaction mixture of styrene poller in this invention, flow rate of the reaction mixture into the heating zone is remarkably increased. This is because the low molecular weight polymer always existing in the aforesaid reaction mixture is formed by the reduced pressure in the heat exchanger. Therefore the flow line of reaction mixture still maintains its original direction after flowing into the heating zone, and the distribution of flow amount to each tube tends to be uneven in the heating zone. This phenomenon results in variation of flow amount, flow amount distribution and residence time in the heating zone. Consequently the efficiency for removing the volatile ingredients is found to have a remarkable fluctuation and the quality of product is greatly dareaged. It is of course possible to homogenize the flow amount distribution to some extent by fitting a dispersion plate at the inlet of heating zone. It, however, is still unsatisfactory so long as the vertical multitubular heat-exchanger is used.

DISCLOSURE OF THE INVENTION

The object of this invention is to provide a method for continuously separating a styrene polymer containing a very small amount of a volatile ingredient by homogeneously flowing a reaction mixture of the styrene polisher containing a low molecular weight polymer into a heating zone of a heat-exchanger and removing the volatile ingredient from the reaction mixture under uniform conditions.

The above object of this invention is achieved by providing a continuous method of treating a polymer reaction mixture which comprises flowing down and preheating the reaction mixture containing aforesaid styrene polymer through a circular-ring-shaped space of a heat-exchanger, said heat exchanger consisting of an outer double pipe as a jacket of circulating heat medium, an concentrically located inner pipe of the heat-exchanger for circulating the heat medium and the circular-ring-shaped space formed in-between, and flashing the reaction mixture containing said styrene polymer into a vacuum chamber connected with said heat-exchanger to continuously separate the styrene polymer and the volatile ingredient.

BRIEF DESCRIPTION OF THE DRAWINGS

FIG. 1 is a vertical section illustrating an embodiment of equipment suitable for use in this invention.

FIG. 2 is a section along the line A—A' in FIG. 1.

In these Figures, 1 is inlet valve, 2 is head of heat-exchanger, 3 is intermediate flange, 4 is heat exchange jacket, 5 is vacuum chamber, 6 is condenser, 7 is discharge pump, 8 is tube in the inner pipe of heat-exchanger, 9 is inner pipe of heat-exchanger, 10 is circular-ring-shaped space, 11 is inside wall of heat-exchanger, 12 is dispersed fluid, 13 is outlet fluid, 14 is volatile gas, 15 is copolymer, 16 is heat medium inlet to inner pipe, 17-19 is heat medium flow line in inner pipe, 20 is heat medium outlet of inner pipe, 21 is heat medium inlet, 22 is heat medium outlet, 23 is vacuum chamber jacket, and 24 is outside wall of heat-exchanger jacket.

PREFERRED EMBODIMENTS OF THE INVENTION

The method of this invention can of course be applied for continuously treating the reaction mixture of styrene polymer polymerized by a batch process and separating the polymer. By combining with such a process that disclosed, for example, in Japanese Patent Laid-open No. 125481/1976, the method of this invention can provide an extremely effective process for continuously preparing the styrene polymer containing a low molecular weight poller.

The styrene polymer which is the object of this invention includes the low molecular weight polymer having a number average molecular weight of 1,000–5,000 and a glass transition temperature ranging 40°–80° C., a styrene polymer consisting of 70–30 parts of above low molecular weight polymer and 30–70 parts of a high molecular weight polymer which has a number average molecular weight (Mn) of 2,000–15,000, a Z average molecular weight (Mz) of not less than 400,000 and a ratio Mz/Mn of 50–600, and a mixture of above styrene polymer with a low molecular weight polyolefin.

The monomer which constitutes so-called styrene polymer of this invention includes styrene and other vinyl toohomer. The examples of other vinyl monomer which may be used include o-methyl styrene, m-methyl styrene, p–methyl styrene, α-methyl styrene, p-t-butyl styrene, vinyl naphthalene, vinyl chloride, vinyl fluoride, vinyl acetate, acrylonitrile, methacrylonitrile, acrylamide, methacrylamide, acrylic acid, methacrylic acid, fumaric acid, maleic acid, itaconic acid, methyl acrylate, ethyl acrylate, n-propyl acrylate, i-propyl acrylate, n-butyl acrylate, i-butyl acrylate, cyclohexyl acrylate, 2-ethylhexyl acrylate, stearyl acrylate, methyl methacrylate, ethyl methacrylate, n-propyl methacrylate, i-propyl methacrylate, n-butyl methacrylate, i- butyl methacrylate, cyclohexyl methacrylate, 2-ethylhexyl methacrylate, stearyl methacrylate, dimethyl fumarate, di-i-propyl fuxarate, di-n-butyl fumarate, di-i-butyl funarate, dimethyl maleate, diethyl maleate, di-i-propyl maleate, di-n-butyl maleate, di-i-butyl maleate, 2-vinylpyridine, N-vinylpyrrole, N-vinylcarbazole, N-vinylindole and N-vinylpyrrolidone. At least one of these toohomers can be copolymerized with styrene. In the practice of this invention, styrene alone or a mixture of styrene with methacrylic acid and/or methyl methacrylate is particularly preferred among these vinyl monomers.

Besides in this invention, a homogeneous mixture of polymer can also be prepared effectively by uniformly mixing other high molecular weight styrene polisher with the reaction mixture of low molecular weight polymer prior to applying the method of this invention. Furthermore the resulting mixture can also be added with at least one of the low molecular weight polyolefins such as low molecular weight polypropylene, polyethylene wax, polytetrafluoroethylene and the like to obtain a uniform mixture.

According to the method of this invention, the volatile ingredients can be continuously removed from the reaction mixture of styrene polymer containing the low molecular weight polymer, which was difficult to perform by the prior art. The volatile content of aforesaid styrene polymer can always be reduced to 0.3% or less without remarkable variation in the efficiency for removing the volatile ingredients. In addition, such low content of volatile matter in the aforesaid styrene polymer can provide electrophotographic toner which is excellent in blocking resistance, offset resistance and electrostatic charge and is very valuable in the actual use.

The equipment for separating the volatile ingredients in this invention includes, for example, that illustrated in FIGS. 1 and 2 which is disclosed in Japanese Patent Laid-open No. 24411/1981. The subject to be treated in this disclosure is a reactive mixture of polymer. The reactive polymer causes a crosslinking reaction by heating in the treatment and generated gel adheres to the pipe. Therefore the object of equipment in above disclosure is to prevent blockage of pipes in the heat-exchanger. On the other hand, the subject of this invention to be treated is a reaction mixture of styrene polymer containing the low molecular weight polymer. In addition, the object of using this equipment in this invention is to uniformly flow the reaction mixture into the heating zone of the heat-exchanger, remove the volatile ingredients from the reaction mixture under uniform conditions and continuously prepare the low molecular weight styrene polymer having a very low content of the volatile ingredients. As mentioned above, the present invention is quite different from aforesaid disclosure in the subject and object of treatment.

A preferred example for continuously treating the reaction mixture in this invention will be illustrated as follows.

That is, bulk polymerization of a vinyl monomer is carried out at 60°-150° C. to an extent of polymerizing 30-90% by weight of the monomer, and after reducing the viscosity of the reaction mixture by the addition of a solvent, a successive solution polymerization is carried out at a temperature of 90°-150° C. to obtain the high molecular weight polymer. A styrene type vinyl monomer is separately polymerized at a temperature of 190°-230° C. in a state of solution to obtain the low molecular weight polymer.

A mixture is prepared from 30-70 parts by weight of the high molecular weight polymer as solid and 70-30 parts by weight of the low molecular weight polymer as solid.

Then the resulting mixture of polymer solution is continuously treated by the method of this invention to remove the solvent. The resulting styrene polymer has a number average molecular weight (Mn) of 2,000-15,000, a Z average molecular weight (Mz) of not less than 400,000 and Mz/Mn of 50-600, and is suitable for the preparation of toner resin.

The present invention will hereinafter be illustrated with respect to examples. Unless otherwise indicated, part means part by weight.

EXAMPLE 1

A homogeneous mixture was prepared by dissolving 0.5 mole of di-t-butyl peroxide per 100 moles of styrene in a solution of 70 parts of styrene in 30 parts of 1:1 solvent mixture of xylene and ethylbenzene. The resulting mixture was continuously charged at a rate of 750 cc/hr into a reactor maintained at a temperature of 210° C. and an internal pressure of 6 kg/cm$^2$ to carry out polymerization. The resulting reaction mixture containing the low molecular weight polymer was charged at the same rate as above from the outlet of reactor through the inlet valve of volatile matter separation equipment to the circular-ring--shaped space of heat-exchanger. The volatile matter separation equipment is illustrated in FIGS. 1 and 2. The equipment has an outer double pipe for additional use as a jacket of circulating heat medium, a concentrically located inner pipe of the heat exchanger for circulating the heat medium and the circular-ring--shaped space formed between the outer and inner pipes. The heat medium circulated through the jacket and inner pipe at 210° C. The temperature was 210° C. at the outlet of reactor and reduced to 190° C. at the inside of heat-exchanger head by the forming due to reduced pressure and latent heat Of vaporization. The reaction mixture was discharged into a vacuum chamber maintained at an absolute pressure of 20 mmHg and a jacket temperature of 140° C. The mixture was separated into gas and liquid phases by flashing and the liquid phase was collected in the bottom of the chamber. The low molecular weight polymer had a temperature of 140° C. after separating the volatile ingredients. The resulting polystyrene was continuously discharged from the bottom of vacuum chamber and had a number average molecular weight of 2,500, a glass transition temperature of 64° C. and a nonvolatile content of 99.9%.

The number average molecular weight was measured in accordance with gel permeation chromatography using polystyrene as standard. The glass transition temperature was measured according to DSC method. The non-volatile content is measured by precisely weighing the sample in a dish, heating it at 105° C. for 90 minutes and weighing the residual weight to calculate the loss. The same methods of analyses were also used in the following Examples and Comparative Examples.

Comparative Example 1

The reaction mixture of Example 1 containing the low molecular weight polymer was heated by using a multitubular heat-exchanger having the pipe outlet directly connecting with the vacuum chamber. The flowing down state of the polymer at the outlet of each pipe in the heat-exchanger was observed from the window equipped on the vacuum chamber. The flow rate from each pipe was unstable and the non-volatile content of discharged polystyrene was reduced to 98.9%.

Comparative Example 2

The procedures of Example 1 were repeated by using the same reaction mixture containing the low molecular weight polymer and employing the same heat exchanger having the same area of flow line and the same area of heat transmission except the circulation of heat medium through the inner pipe was omitted (that is, used as a hollow pipe). The non-volatile content of discharged polystyrene was reduced to 99.2%.

Example 2

The reaction mixture of Example 1 containing the low molecular weight polymer was used as the first component. A high molecular weight styrene polisher derived from 70 parts of styrene and 30 parts of n-butyl acrylate and having a weight average molecular weight of 300,000 and a glass transition temperature of 58° C. was used as the second component. The first and second components were respectively, dissolved in xylene. Both xylene solutions were uniformly mixed in amounts to give a 50:50 weight ratio of the low molecular weight and high molecular weight polymers. Thereafter the same procedures as in Example 1 were carried out by using the same volatile matter separation equipment. The resulting styrene polymer was a homogeneous mixture of the high molecular weight and low molecular weight polymers and had a non-volatile content of 99.9%.

Example 3

The reaction mixture of Example 1 containing the low molecular weight polymer was added with 5% by weight of a low molecular weight polypropylene and uniformly mixed. Thereafter the same procedures as in Example 1 was carried out. The low molecular weight styrene polymer obtained was a homogeneous mixture with the low molecular weight polypropylene and had a non-volatile content of 99.9%.

Example 4

Styrene methacrylic acid copolymer was prepared by using the same procedures as in Example 1 except 67 parts of styrene and 3 parts of methacrylic acid was used in place of 70 parts of styrene. The resulting copolymer had a number average molecular weight of 3,800, a glass transition temperature of 70° C., and a non-volatile content of 99.8%.

Example 5

A nitrogen replaced flask was charged with 72 parts of styrene and 28 parts of butyl acrylate as vinyl polymers, and heated to 120° C. Bulk polymerization was conducted for 10 hours at this temperature to obtain a conversion of 55%. Successively 30 parts of xylene were added to prepare a solution. A mixture containing 0.1 part of dibutyl peroxide dissolved in 50 parts of xylene was continuously add to the solution over 8 hours at 130° C. The reaction was continued for an hour after completing the addition. The resulting high molecular weight polymer was named A-1.

In the next step, polymerization was conducted by continuously adding at a rate of 750 cc/hr a homogeneous solution of 0.5 mole of di-t-butyl peroxide per 100 moles of styrene in a mixture of 70 parts of styrene and 30 parts of a mixed solvent consisting of xylene and ethylbenzene. The reaction conditions maintained were an internal reactor temperature of 210° C, the internal pressure of 6 kg/cm$^2$ and an outlet temperature of 100° C.

The resulting low molecular weight styrene polymer had a conversion of 99.5% by weight. The molecular weight was measured in accordance with gel permeation chromatography by using monodispersed standard polystyrene as a reference example and tetrahydrofuran as an eluent. The number average molecular weight thus obtained was 2,100.

Besides the solid polisher A-2 was obtained by separately removing the solvent and its glass transition temperature (Tg) was measured with a differential scanning calorimeter by using alumina as reference. The Tg measured was 70° C.

A mixture was prepared from 50 parts of above low molecular weight styrene polymer A-2 and 90 parts of the aforesaid high molecular weight polymer A-1 (50 parts as solid). The solvent was removed from the mixture by employing the same volatile matter separation equipment of Example 1 as illustrated in FIGS. 1 and 2. The mixture was heated to 200° C. and flashed into a vacuum system maintained at 10 mmHg by using almost the same conditions as in Example 1. The resulting polymer had Mn of 2,800, Mz of 652,000, Mz/Mn of 233 and Tg of 57° C. In addition the polymer had a residual volatile content of 0.09%.

The styrene polymer thus obtained was evaluated of the characteristics as the electrophotographic toner.

Preparation of the toner

In a Henshel mixer, 100 parts of the resin, 10 parts of carbon black (MA-100: a product of Mitsubishi Chemical Co.) as a coloring agent, 3 parts of polypropylene wax and 0.5-2 parts of Spiron Black TRH as a charge regulator were mixed. The mixture was hot-kneaded with a twin screw extruder at a temperature of 140° C. (inlet)–150° C. (outlet), cooled and crushed. The resulting coarse particles were finely ground with a jet mill and subjected to air classification to obtain the toner having a particle size of 8-20 μm (11.5 μm in average). The resulting toner was mixed with 0.15 part of colloidal silica in Henshel mixer and tested.

The amount of charge controlling agent was controlled to obtain −15 μC/g of blow-electrostatic charge after mixing 95 parts of the carrier for EP870 with 5 parts of the toner in a V-blender for 30 minutes.

Evaluation as the Toner

Furthermore duplication characteristics were measured under the following conditions by Electrophotographic Copying Machine EP870 (a product from Minolta Camera Co. ) equipped with Teflon hot-rolls.

Fixing ability

A plastic eraser "MONO" (a product from Tombo Pencil Co.) was gone back and forth 20 times with a constant force between a solid black part and a non-tonered white part on a duplicated sheet. Toner removal from the black part and soil of the white part were observed and divided into the following four classes.

⊙. . . No toner removal at all.
O. . . Good
Δ. . . Toner was somewhat removed.

X . . . Poor. Toner was removed and caused much soil.

Contamination of the white background

The white part of the 100th sheet was compared with that of the 10,000th sheet in a continuous copying operation. The degree of contamination on the white background due to the scattering of toner was divided into the following three classes.

○. . . Good

△. . . Contamination was observed with a magnifying glass having a magnification of 30 times.

X . . . Contamination was observed with the naked eye.

Offset resistance

The offset refers to a phenomenon that a part of the toner is attached on the surface of a fixing roll and then transferred again onto the fresh surface of a paper after one rotation of the roll to cause the contamination of the paper.

○. . . No contamination was found over 10,000 sheets of continuous copying operation.

X . . . Contamination was found in the same conditions.

Blocking resistance

Blocking resistance was evaluated by observing the aggregation after allowing to stand the toner for 8 hours at the temperature of 55° C. under 80% relative humidity. Results were illustrated by the following four classes.

⊚. . . No aggregation was found at all.

○. . . Aggregation was found partially but easily unfastened.

△. . . Firm coagulate was found in part.

X . . . Firm coagulate was found entirely.

Variation of electrostatic charge

In the continuous copying operation, triboelectrostatic charges of the 100th and 10,000th duplicates were expressed by the following ratio (absolute value).

$$\frac{\text{(Amount of charge after 10,000th duplicate)} - \text{(Amount of charge after 100th duplicate)}}{\text{(Amount of charge after 100th duplicate)}} \times 100(\%)$$

When the ratio was not more than 10(%), the variation was considered good.

Dispersibility of the coloring agent

A slide glass was put on a hot plate previously heated at 250°–300° C. and a small amount of the toner was placed on the slide glass. A cover glass was put on the toner sample simultaneously with the fusion of the toner and pressed with a given pressure for 60 seconds. The sample was taken out of the hot plate and allowed to cool. The dispersion of coloring agent was observed with an optical transmission microscope having a magnification of 400–1,000 times.

The results of the observation was divided into the following two classes.

○. . . No undispersed or aggregated particles of the coloring agent were found in any field of vision.

X . . . Many undispersed or aggregated particles of the coloring agent were found.

Reproducibility of the completely solid black part

Irregular gloss of the solid black part was observed on the 100th duplicate from the start of copying operation. The results were divided into the following three classes.

○. . . Irregular gloss was slight.

△. . . Irregular gloss was found in some degree.

X . . . Irregular gloss was remarkable.

| (Evaluation results as toner) | |
|---|---|
| Fixing ability | ⊚ |
| Contamination of the white background | ○ |
| Offset resistance | ○ |
| Blocking resistance | ⊚ |
| Variation of electrostatic charge | 5.2 |
| Dispersibility of the coloring agent | ○ |

What is claimed is:

1. An electrophotographic toner comprising styrene polymer or copolymer with other vinyl monomer, having a number average molecular weight (Mn) of 2,000–15,000, a Z average molecular weight (Mz) of between 400,000 and 9,000,000, and Mz/Mn of 50–600, and comprising 70–30 parts of a low molecular weight polymer having a number average molecular weight of 1,000–5,000 and a glass transition temperature of 40°–80° C., and 30–70 parts of a high molecular weight polymer which gives said styrene polymer or copolymer having said Mn, Mz and Mz/Mn when mixed with said low molecular weight polymer, said styrene polymer or copolymer being produced by flowing down and preheating a reaction mixture containing said styrene polymer or copolymer by causing said mixture to flow through a circular-ring-shaped space of a heat-exchanger, said heat-exchanger consisting of an outer double pipe as a jacket of a circulating heat medium, a concentrically loaded inner pipe of the heat-exchanger for circulating the heat medium and the circular-ring-shaped space formed in between, and flashing the reaction mixture containing said styrene polymer into a reaction mixture containing with said heat-exchanger to continuously separate the styrene polymer with 0.3% or less of volatile ingredient.

2. The electrographic toner of claim 1, wherein said toner further comprises a polyolefin.

* * * * *

UNITED STATES PATENT AND TRADEMARK OFFICE
CERTIFICATE OF CORRECTION

PATENT NO. : 5,334,473
DATED : August 2, 1994
INVENTOR(S) : Nobuki KOBAYASHI, et al.

It is certified that error appears in the above-indentified patent and that said Letters Patent is hereby corrected as shown below:

On the title page, Item [63] and Column 1, Lines 5-10, the Related U.S. Application Data should read:

--Continuation-in-part of Ser. No. 320,239, Feb. 24, 1989,
  Pat. No. 5,084,368, filed as PCT/JP87/00719, Sep. 30, 1987;
  and a continuation of Ser. No. 922,008, Aug. 4, 1992, abandoned,
  which is a continuation of Ser. No. 360,888, Jan. 23, 1991,
  abandoned, filed as PCT/JP87/00721, Sep. 30, 1987.--

Signed and Sealed this

Sixteenth Day of May, 1995

Attest:

BRUCE LEHMAN

*Attesting Officer*   Commissioner of Patents and Trademarks